US011067837B2

(12) United States Patent
Pau

(10) Patent No.: US 11,067,837 B2
(45) Date of Patent: Jul. 20, 2021

(54) POLARIZATION STATE SCRAMBLER

(71) Applicant: Arizona Board of Regents on Behalf of the University of Arizona, Tucson, AZ (US)

(72) Inventor: Stanley Pau, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 16/546,886

(22) Filed: Aug. 21, 2019

(65) Prior Publication Data

US 2020/0064662 A1 Feb. 27, 2020

Related U.S. Application Data

(60) Provisional application No. 62/720,591, filed on Aug. 21, 2018.

(51) Int. Cl.
*G02F 1/01* (2006.01)
(52) U.S. Cl.
CPC .......... *G02F 1/0136* (2013.01); *G02F 1/0139* (2021.01)
(58) Field of Classification Search
CPC .............. G02F 1/0136; G02F 1/0063; G02F 2001/0139
(Continued)

(56) References Cited

U.S. PATENT DOCUMENTS 1,071,889 A 9/1913 Dehn
6,498,869 B1 * 12/2002 Yao ..................... G02B 6/2706
359/494.01
(Continued)

FOREIGN PATENT DOCUMENTS

WO 2019/094627 5/2019

OTHER PUBLICATIONS

F. Heismann et al., "High-speed polarization scrambler with adjustable phase chirp," IEEE J. Selected Topics in Quantum Electronics, vol. 2, No. 2, p. 311 (1996).
(Continued)

*Primary Examiner* — Robert Tavlykaev
(74) *Attorney, Agent, or Firm* — Perkins Coie LLP

(57) ABSTRACT

Devices, systems and methods are described that efficiently convert an incident light having a particular polarization into light having a plurality of polarizations that are distributed according to a particular pattern. For example, the output light can have a plurality of plurality of polarization states that are randomly distribute over the Poincaré sphere. One polarization scrambler includes a plurality of polarization elements positioned to receive polarized or partially polarized light. Each polarization element includes a half waveplate to rotate a polarization direction of the polarized or partially polarized light, and a quarter waveplate to receive light that exits the first layer and to change a polarization state of the light that exits the first layer to another polarization state. The polarization scrambler further includes a substrate to receive the light after exiting the quarter waveplate, and to provide the output light that includes a plurality of polarization states.

23 Claims, 8 Drawing Sheets

(58) Field of Classification Search
USPC .......................................................... 385/11
See application file for complete search history.

(56) References Cited

U.S. PATENT DOCUMENTS

| | | | | |
|---|---|---|---|---|
| 6,563,582 | B1* | 5/2003 | Chun | G02B 5/1814 250/332 |
| 8,111,458 | B2* | 2/2012 | Murooka | G02B 5/00 359/486.01 |
| 8,696,134 | B2* | 4/2014 | Murakawa | G02B 5/3008 353/20 |
| 8,866,997 | B2 | 10/2014 | Pau et al. | |
| 9,671,538 | B2 | 6/2017 | Pau et al. | |
| 10,151,982 | B2* | 12/2018 | Fiolka | G03F 7/70116 |
| 10,254,453 | B2 | 4/2019 | Pau et al. | |
| 2004/0016874 | A1* | 1/2004 | Rao | H04J 14/08 250/225 |
| 2006/0023987 | A1* | 2/2006 | Yao | G01J 4/00 385/11 |
| 2011/0007232 | A1* | 1/2011 | Shen | G02F 1/0136 349/18 |
| 2011/0267483 | A1* | 11/2011 | Kanamori | H04N 5/2256 348/220.1 |
| 2012/0268818 | A1* | 10/2012 | Liu | G02B 1/002 359/494.01 |
| 2014/0036943 | A1* | 2/2014 | Janssens | G02B 27/28 372/27 |
| 2014/0340626 | A1* | 11/2014 | Schadt | G02B 5/30 349/194 |
| 2016/0170110 | A1 | 6/2016 | Pau et al. | |
| 2017/0219853 | A1* | 8/2017 | Philipson | G02F 1/0121 |
| 2018/0157068 | A1* | 6/2018 | Yanai | G02F 1/1335 |

OTHER PUBLICATIONS

M. N. Miskiewicz et al., "Direct-writing of complex liquid crystal patterns," Optics Express vol. 22, No. 10, 12691 (2014).
R. A. Chipman et al., Chapter 14 in Handbook of Optics, 3rd edition, vol. 1, Geometrical and Physical Optics, Polarized Light, Components and Instruments, McGraw-Hill, NY 2009.
Hsu, Wei-Liang, et al., "Infrared liquid crystal polymer micropolarizer," Appl. Opt. 53, 5252-5258 (2014).
Hsu, Wei-Liang, et al., "Patterned cholesteric liquid crystal film," JOSA A 30 (2), pp. 252-258 (2013).
Myhre, Graham, et al., "Imaging capability of patterned liquid crystals," Appl. Opt. vol. 48, No. 32, pp. 6152-6158, (2009).
Myhre, Graham, et al., "Patterned color liquid crystal polymer polarizers," Optics Express, vol. 18, No. 26, pp. 27777-27789, (2010).

* cited by examiner

US 11,067,837 B2

POLARIZATION STATE SCRAMBLER

CROSS REFERENCE TO RELATED APPLICATIONS

This application claims priority to the provisional application with Ser. No. 62/720,591, titled "Polarization State Scrambler," filed Aug. 21, 2018. The entire contents of the above noted provisional application are incorporated by reference as part of the disclosure of this document.

TECHNICAL FIELD

The subject matter of this patent document relates to methods and devices to convert a polarized or partially polarized light into unpolarized light, with applications in telecommunication, imaging, illumination and other fields of technology.

BACKGROUND

Many light sources, such as high-performance lasers, emit polarized light. However, for some applications, unpolarized light or light having a particular distribution of polarization states is needed. Many existing devices for generating unpolarized light are expensive and bulky, and further require power sources, which can make their implementations in applications, where power, cost or real estate are important, undesirable or even impossible. Thus, there is a need to efficiently and rapidly convert light that is polarized into unpolarized light or light that has particular distribution of output polarization states.

SUMMARY OF CERTAIN EMBODIMENTS

The disclosed embodiments describe devices and methods that, among other features and benefits, efficiently convert an incident light having a particular polarization into light having a plurality of polarizations that are distributed according to a particular pattern. For example, the output light can have a plurality of plurality of polarization states that are randomly distributed over the entire, or a portion of, the Poincaré sphere. Among other features and benefits, the disclosed devices can be lightweight, compact, and include only passive components.

For instance, one aspect of the disclosed embodiments relates a polarization scrambler that includes a plurality of polarization elements positioned to receive polarized or partially polarized light, where each polarization element includes at least two layers: a first layer that includes a half waveplate to rotate a polarization direction of the polarized or partially polarized light, and a second layer that includes a quarter waveplate to receive light that exits the first layer and to change a polarization state of the light that exits the first layer to another polarization state. The polarization scrambler further includes a substrate to receive light after exiting the second layer of each polarization element, and to allow the light received by the substrate to pass therethrough, where the light output from the substrate includes a plurality of polarization states.

DETAILED DESCRIPTION

In the following description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

The polarization state of light can be described by the Stokes vector S, which consists of the four elements $S_0$, $S_1$, $S_2$, and $S_3$. $S_0$ represents the intensity of an optical field; $S_1$ and $S_2$ denote the affinity towards 0° and 45° linear polarizations, respectively; and $S_3$ expresses the difference between right and left circular polarizations. Using S, the angle of linear polarization, degree of polarization (DOP), degree of linear polarization (DOLP), and degree of circular polarization (DOCP) can be calculated.

$$\theta_{linear} = \frac{1}{2}\tan^{-1}\frac{S_2}{S_1}$$

$$DOP = \sqrt{S_1^2 + S_2^2 + S_3^2}\Big/S_0$$

$$DOLP = \sqrt{S_1^2 + S_2^2}\Big/S_0$$

$$DOCP = S_3/S_0$$

Both DOP and DOLP can range from a value of zero, for a completely unpolarized light, to a value of 1, for a completely polarized light. DOCP can range from a value of −1, for a completely left-hand circularly polarized light, to a value of 1, for a completely right-hand circularly polarized light.

Figure 1:
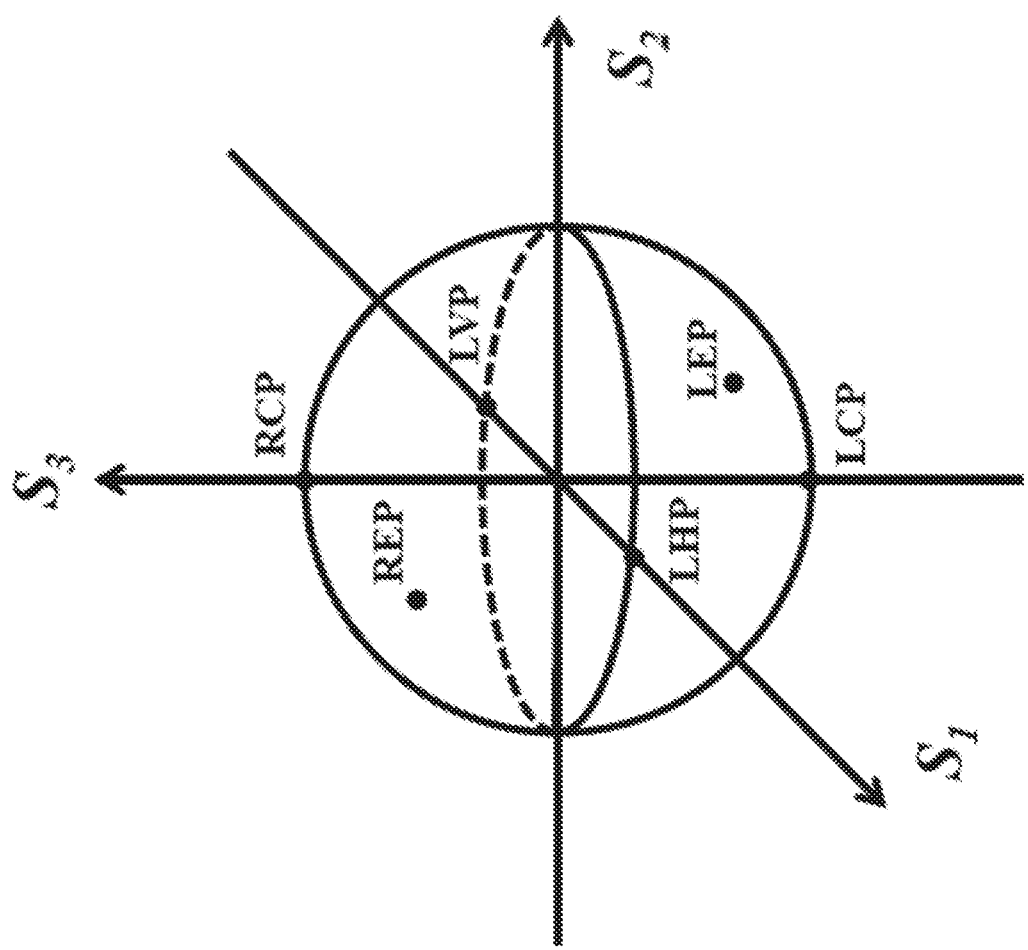
FIG. 1 illustrates a graphical presentation of the Stokes vector components on the Poincaré sphere.

The Poincaré sphere is a graphical presentation of the Stokes vector components $S_1$, $S_2$, and $S_3$, as illustrated in FIG. 1. Each point on the Poincaré sphere represents a unique polarization state of light. In this description, the north and south poles represent right-hand circularly polarized (RCP) and left-hand circularly polarized (LCP) lights, respectively. All points on the equator of the Poincaré sphere represent linear polarized light of different orientation angles. All points between the equator and the north pole represent right-hand elliptically polarized (REP) light. All points between the equator and the south pole represent left-hand elliptically polarized (LEP) light. FIG. 1 also shows linear horizontal polarized light (LHP), and linear vertically polarized light (LVP).

Many high-performance lasers utilized in telecommunication, remote sensing, imaging and LIDAR systems emit light that is polarized. For many applications, however, unpolarized light is often desirable and there is a need to rapidly and efficiently convert the polarized light output of the laser into unpolarized light.

The following examples illustrate a few scenarios in which the use of unpolarized light can be beneficial. In illumination and imaging applications, an unpolarized light source is often desirable. For example, many displays in cell phones and car instrument panels are polarized and cannot be easily seen when a person is wearing polarized sun glasses. For an outdoor projector that is polarized, polarized sun glasses can block part or most of the light. In these cases, the solution is to use unpolarized light. In general, polarized light incident on a reflecting object can create specular reflection, depending on the incident angle and the optical properties of the reflector. If the illumination is polarized, the intensity of the reflected light can be highly dependent on the incoming light polarization. This can create artifacts in imaging of an object, leading to over or under exposure of the image. An unpolarized light illumination can reduce or eliminate many of the problems.

In fiber optic communication systems, the light signal is highly sensitive to polarization impairments such as polarization mode dispersion and polarization dependent losses. Lithium niobate (LiNbO3) scramblers, which operate as tunable waveplates that modulate the polarization state of light, are often utilized to mitigate some of polarization dependent problems by converting a fixed incoming polarized light into a randomly (or pseudo-randomly) polarized light at different times. In telecommunication, the scrambling rate should be faster than the inverse gain recovery time of the fiber amplifier. The performance of the scrambler includes the DOP of the output light, the response time of the scrambler, and the uniformity of the output light on covering the Poincaré sphere. The systems that rely on tunable waveplates, however, require signal generators, electronics, wirings, and other components to generate and deliver the electrical signals to modulate the waveplate, thus making such systems bulkier and more expensive. Ideally, the scrambler should have a low cost, low wavelength and temperature sensitivities, and long lifetime.

The disclosed embodiments describe devices and methods that, among other features and benefits, utilize a passive component, such as a specially designed phase mask, to efficiently convert an incident light having a particular polarization into light having randomly distributed polarizations, or more generally, into output light having a plurality of polarizations that are distributed according to a particular pattern. These features are achieved at a low cost, and with high efficiency.

Figure 2:
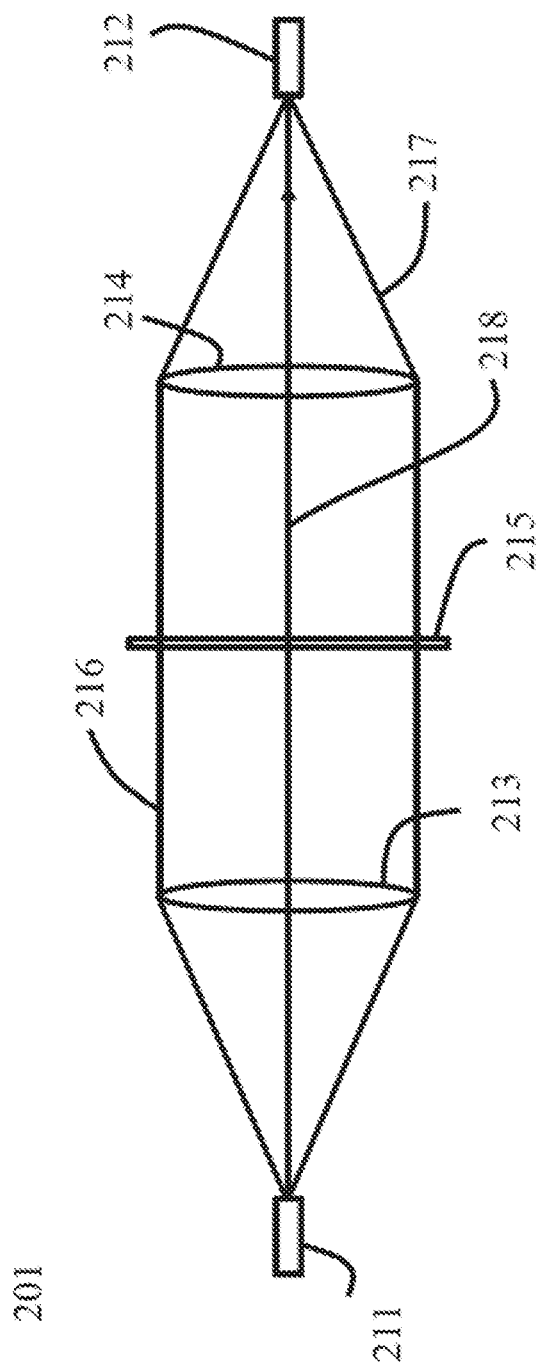
FIG. 2 illustrates a polarization scrambling system in accordance with an exemplary embodiment.

According to some embodiments, a polarization scrambler can be implemented by an array of multi-layer waveplates of different orientations. FIG. 2 shows one exemplary embodiment of a polarization scrambling system 201, where a polarized light source 211 emits light, denoted by light rays 216, 217 and 218, which is collimated by a lens 213, passes through a pixelated waveplate 215 (described in further detail below), is refocused by a lens 214, and is collected by an output optical fiber 212. The source 211 can be, for example, an optical fiber connected to a semiconductor laser.

It should be noted that the disclosed technology for generating an output light having a plurality of different polarization states can be implemented in systems other than the one that is depicted in FIG. 2. For example, while FIG. 2 shows a collimated light beam that is incident on the waveplate 215, in some implementations, the incident beam may not be collimated, and/or may impinge on the waveplate at a non-zero angle. In another implementation, an additional mirror, with known polarization properties, may be used to reflect light rays to be collected by an optical fiber.

Figure 3:
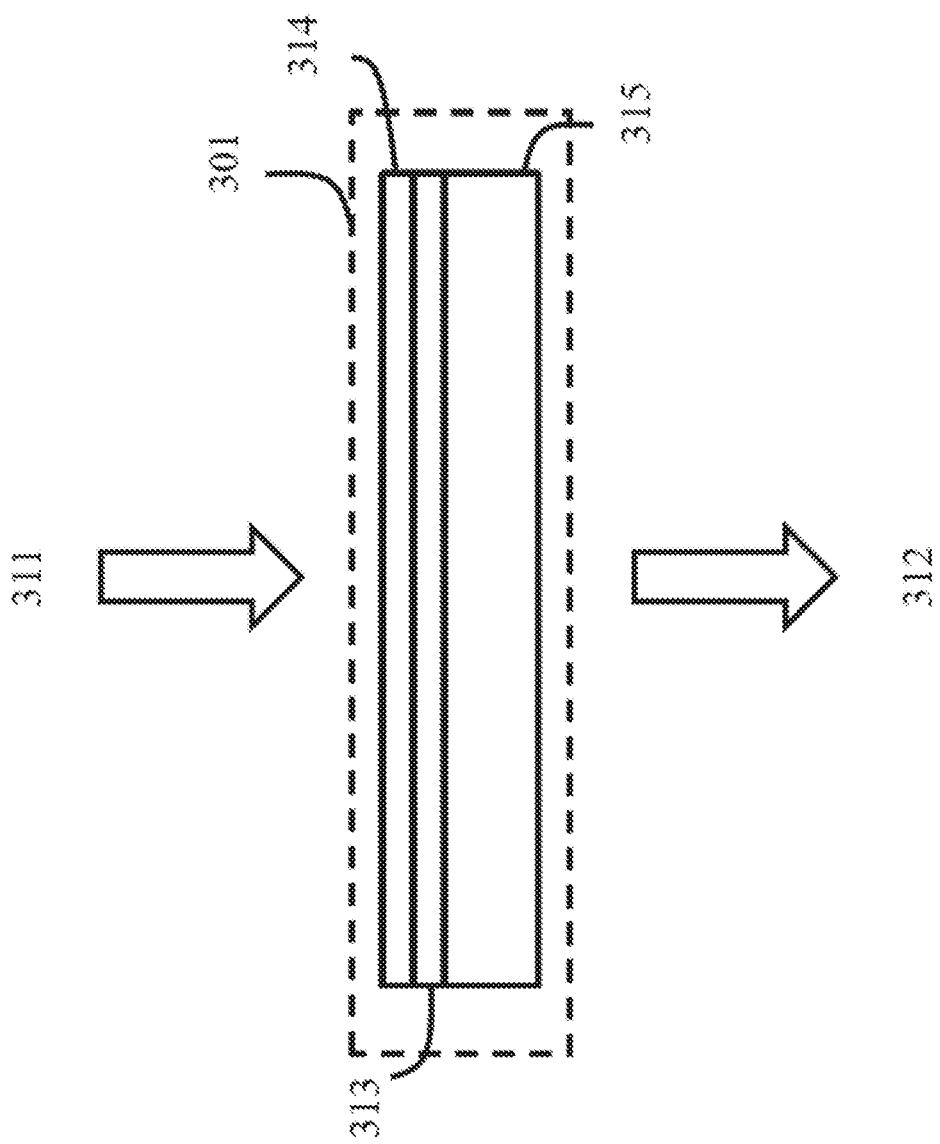
FIG. 3 illustrates a multi-layer waveplate that can be used to convert linear polarized light to light having a particular polarization in accordance with an exemplary embodiment.

In order to understand the operation of the polarization scrambler, let us consider the case of converting linear polarized light to light having a particular (e.g., arbitrary) polarization using a two-layer waveplate, as is shown in FIG. 3. Note that the disclosed technology, however, is not limited to the two-layer example of FIG. 3, but can be implemented using more than two layers, and in some implementations using a single layer. Moreover, the disclosed waveplates can be designed to operate at a specific wavelength or it can be achromatic over a range of wavelength. U.S. Patent Application Publication No. 2016/0170110 A1 that is issued as U.S. Pat. No. 10,254,453 B2, which is incorporated by reference herein, describes example construction techniques for certain waveplates. The waveplates can be made of birefringent materials, such as liquid crystal polymer, metamaterial, crystal and combination thereof. FIG. 3 shows an incoming linearly polarized light 311 that is converted to an outgoing polarized light 312 by passing through a two-layer waveplate 301.

Figure 4:
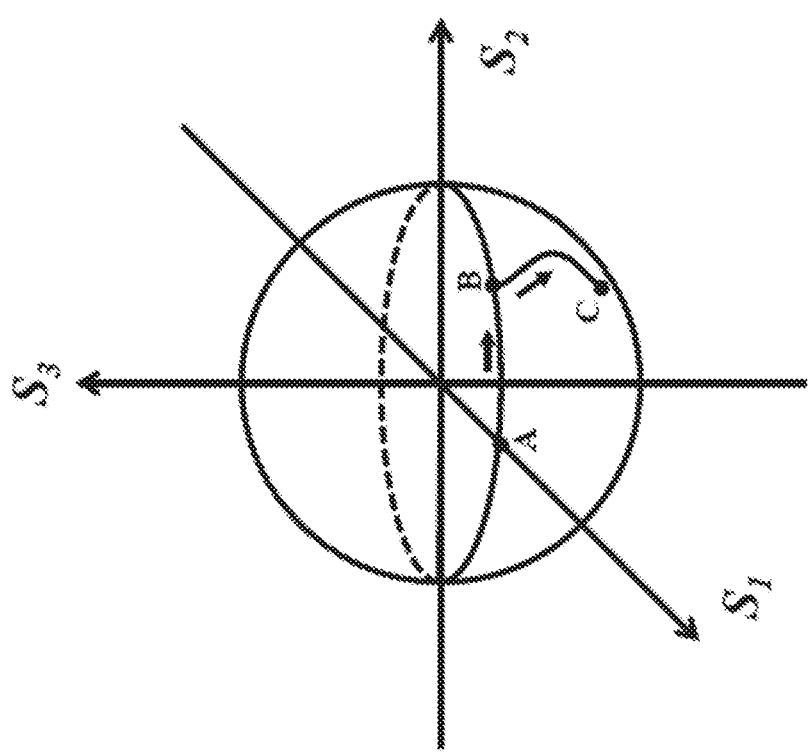
FIG. 4 illustrates a step-wise conversion of a linear polarization state to another linear polarization state, and then to a non-linear polarization state conversion on a Poincaré sphere in accordance with an example embodiment.

In depicted exemplary embodiments, the waveplate 301 includes a half waveplate (HWP) 314 and a quarter waveplate (QWP) 313 on a transparent substrate 315. The purpose of the half waveplate 314 is to rotate the polarization direction of the linearly polarized light by an angle $2\theta$, where $-\theta$ is the angle between the fast axis of the half waveplate and the direction of the polarized light. The purpose of the quarter waveplate 313 is to convert the rotated linearly polarized light to an elliptically or circularly polarized light. The chirality and the ellipticity of the final state are determined by the angle between the direction of the rotated polarized light, after passing through the half waveplate 314, and the fast axis of the quarter waveplate. Thus, by using a half waveplate and a quarter waveplate of different orientations, a linear polarization state can be converted to another linear polarization state, and then to a circular or an elliptical polarization state. FIG. 4 illustrates such a conversion on a Poincaré sphere that shows the conversion of linear polarization state A to another linear polarization state B by a half waveplate, and then to a non-linear polarization state C by a quarter waveplate.

It should be noted that a typical waveplate is made of a birefringent crystal with a particular orientation and thickness. The crystal is cut into a plate such that the optical axis of the crystal is parallel to the surfaces of the plate. This produces two axes that are positioned in the plane of the cut: the ordinary axis, with is usually denoted as having an index of refraction $n_o$, and the extraordinary axis, which is usually denoted as having an index of refraction $n_e$. For a light that is incident normally on the plate, the polarization component along the ordinary and extraordinary axes pass through the crystal at different velocities due to the differing indices of refraction. When $n_e<n_o$ (e.g., in calcite), the extraordinary axis is called the fast axis and the ordinary axis is called the slow axis. When $n_e>n_o$, the nomenclature is reversed.

As an example, let us consider a linearly polarized source, with a horizontal fast axis that is parallel to the x axis. The Stokes vector of the light is given by $$S_{in} = \begin{bmatrix} 1 \\ 1 \\ 0 \\ 0 \end{bmatrix}.$$

Let us assume that we want to create an arbitrary polarization state parameterized by angles $(\alpha, \varepsilon)$, where $\alpha$ is the major axis orientation of the polarization ellipse and $\varepsilon$ is the latitude. Each set of angles, $(\alpha, \varepsilon)$, represents a unique point on the Poincaré sphere, and has a polarization state represented by a Stokes vector as:

$$S_{out}(\alpha, \varepsilon) = \begin{bmatrix} 1 \\ \cos(2\alpha)\cos\varepsilon \\ \sin(2\alpha)\cos\varepsilon \\ \sin\varepsilon \end{bmatrix}$$

The Mueller matrix of a half waveplate with fast axis at angle $\theta$ is given by:

$$M_{HWP}(\theta) = \begin{bmatrix} 1 & 0 & 0 & 0 \\ 0 & \cos 4\theta & \sin 4\theta & 0 \\ 0 & \sin 4\theta & -\cos 4\theta & 0 \\ 0 & 0 & 0 & -1 \end{bmatrix}$$

The Mueller matrix of a quarter waveplate with fast axis at angle $\theta$ is given by:

$$M_{QWP}(\theta) = \begin{bmatrix} 1 & 0 & 0 & 0 \\ 0 & \cos^2 2\theta & \cos 2\theta \sin 2\theta & -\sin 2\theta \\ 0 & \cos 2\theta \sin 2\theta & \sin^2 2\theta & \cos 2\theta \\ 0 & \sin 2\theta & -\cos 2\theta & 0 \end{bmatrix}.$$

The linearly polarized light passes through a half waveplate having a fast angle, $\theta_{HWP}$, and a quarter waveplate having a fast angle, $\theta_{QWP}$. The input and output light are related by:

$$S_{out} = M_{QWP}(\theta_{QWP}) M_{HWP}(\theta_{HWP}) S_{in}.$$

Additionally, $$\tan(2\alpha) = \frac{\sin(4\theta_{HWP})\cos(2\theta_{QWP})\sin(2\theta_{QWP}) + \sin(4\theta_{HWP})\sin^2(\theta_{QWP})}{\cos(4\theta_{HWP})\cos^2(\theta_{QWP}) + \sin(4\theta_{HWP})\cos(2\theta_{QWP})\sin(2\theta_{QWP})},$$

and $$\sin(\varepsilon) = \cos(4\theta_{HWP})\sin(2\theta_{QWP}) - \sin(4\theta_{HWP})\cos(2\theta_{QWP}).$$

Given a set of angles $(\alpha, \varepsilon)$, the angles $(\theta_{QWP}, \theta_{HWP})$ of the quarter and half waveplates can be solved using the above equations, which allows the selection or design of the appropriate half waveplate and quarter waveplate to achieve the desired output polarization. The above procedure can be repeated to determine the proper combination of half waveplate and quarter waveplates needed for a scrambler that includes a plurality of such two-layer element to generate output light having a plurality of different polarization states.

It should be noted that in this patent document, the words polarization scrambler or scrambler are sometimes used to refer to a device that can receive light having a particular polarization and produce an output light having a plurality of different polarizations. While, in some embodiments, the polarization states of the output light can correspond to randomly distributed locations on the Poincaré sphere, in some embodiments, the distribution of polarizations of the output light on the Poincaré sphere may not be random, may be distributed on only a particular section of the Poincaré sphere, and/or may conform to a particular distribution pattern.

Figure 5:
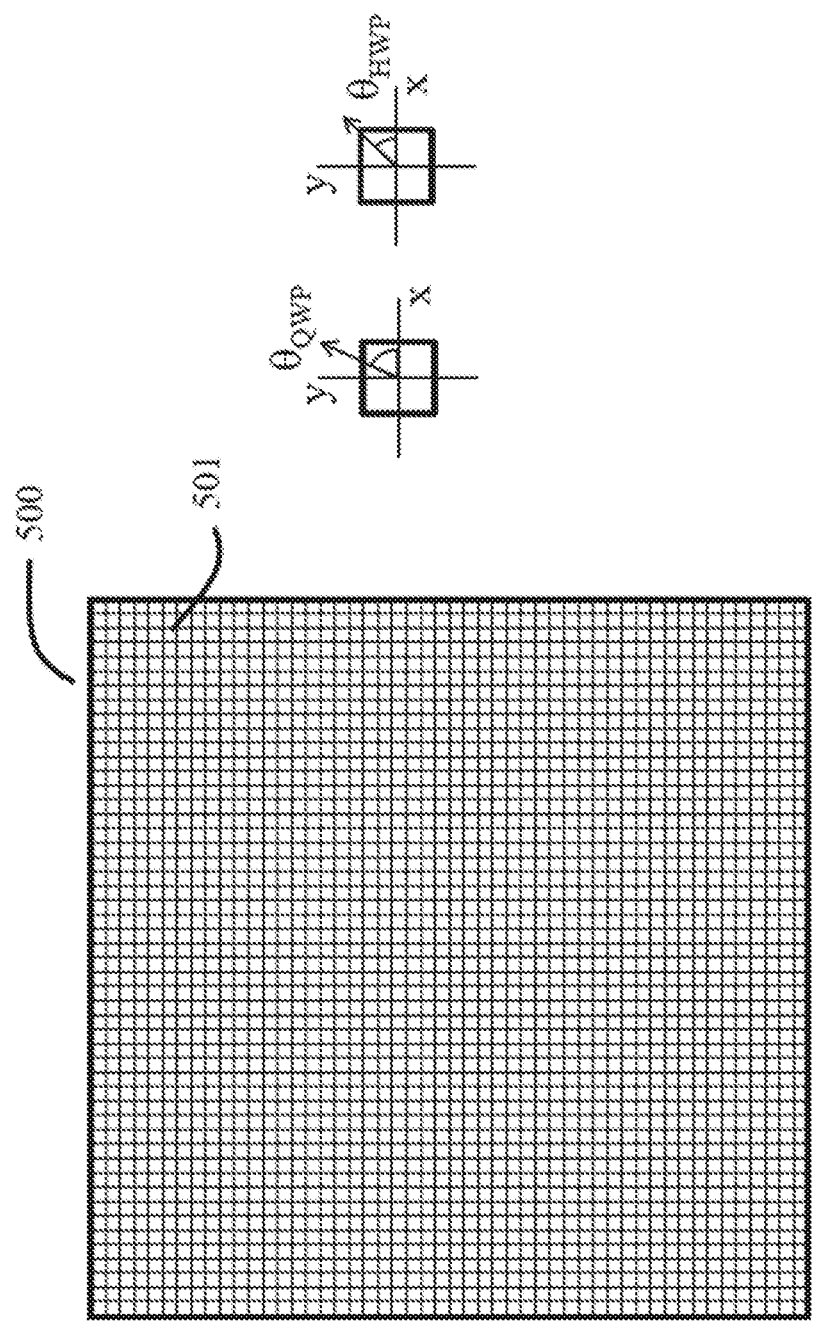
FIG. 5 illustrates a two-dimensional array of two-layer waveplates that can be used in a polarization scrambler in accordance with an exemplary embodiment
Figure 6:
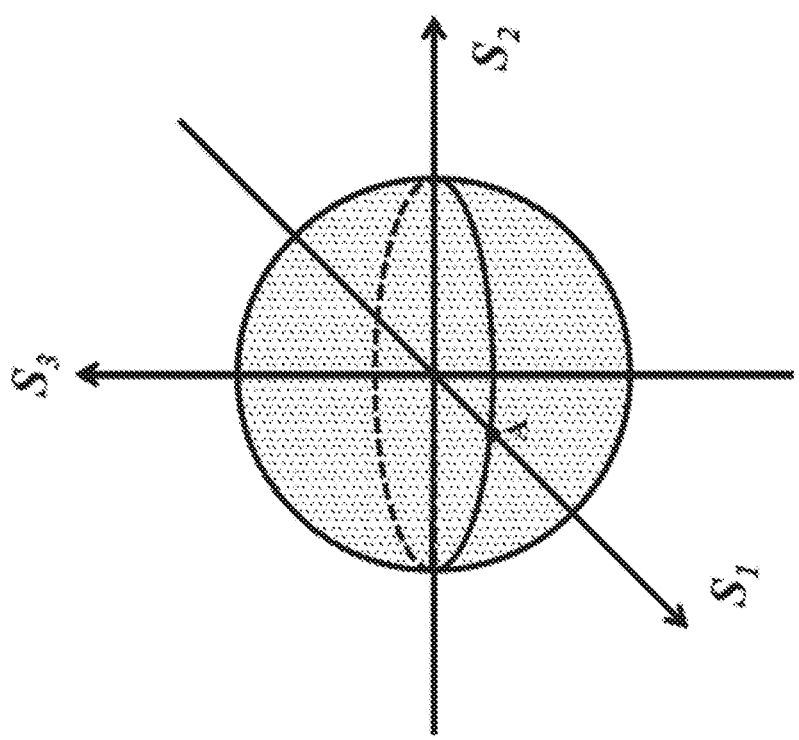
FIG. 6 illustrates a set of polarization states distributed uniformly on the surface of a Poincaré sphere that can be produced using the two-dimensional array of FIG. 5 in accordance with an exemplary embodiment.

In some embodiments, a two-dimensional array of two-layer waveplates are formed to produce a polarization scrambler. Each two-layer waveplate has a different fast axis angle for the half waveplate and quarter waveplate. FIG. 5 show an exemplary square array 500 (having N×N=$N^2$ polarization elements 501, N being an integer), where each polarization element 501 is a two-layer waveplate. Each polarization element 501 in the array includes a layer of quarter waveplate having a fast angle $\theta_{QWP}$, and a layer of half waveplate having a fast angle $\theta_{HWP}$. FIG. 6 shows a set of $N^2$ polarization states distributed uniformly on the surface of the Poincaré sphere that can be produced using the waveplate 500 of FIG. 5. Once again, each point on the Poincaré sphere represents a unique polarization state, and a unique pair of fast axis angles for the half waveplate and quarter waveplate. In this example, the polarization scrambler operates by converting light of linear polarization states to light of $N^2$ different linear, circular or elliptical polarization states, distributed uniformly on the Poincaré sphere, using an array waveplate.

The disclosed embodiments can be implemented to produce any number of polarization states, such as polarization states in the range from 10 to $10^9$ or more, which are determined by the requirements for each application. In some embodiments, the scrambler can be shaped as a rectangular grid (an M×N grid, to enable M×N different polarization states). The distribution of the waveplates does not necessarily have to be in a grid format; e.g., the distribution can be in a random, periodic or non-periodic format. In some embodiments, the scrambler can have a circular or an oval shape. In general, the scrambler can have an arbitrary shape, as long as it includes a plurality of two-layer waveplates. In some embodiments, the distribution of the waveplates can be designed in such a way to compensate for the intensity variations of the collimated input light. In addition, the distribution of the final (e.g., $N^2$) polarization states does not have to cover the entire Poincaré sphere. For some applications, it may be desirable to only select those final polarization states that cover part of the Poincaré sphere. The waveplate may include one or more antireflection coatings to reduce losses on one or both sides of the array. Moreover, in some applications, the input light may be partially polarized. In such scenarios, the calculation of the angles of the waveplates in the array can be determined by using a starting input light polarization state that best describes the partially polarized state of the input light and the desired ending polarization state. For example, if the initial state can be described by a distribution on the Poincaré sphere, the centroid of the distribution may be used as the initial state.

Figure 7:
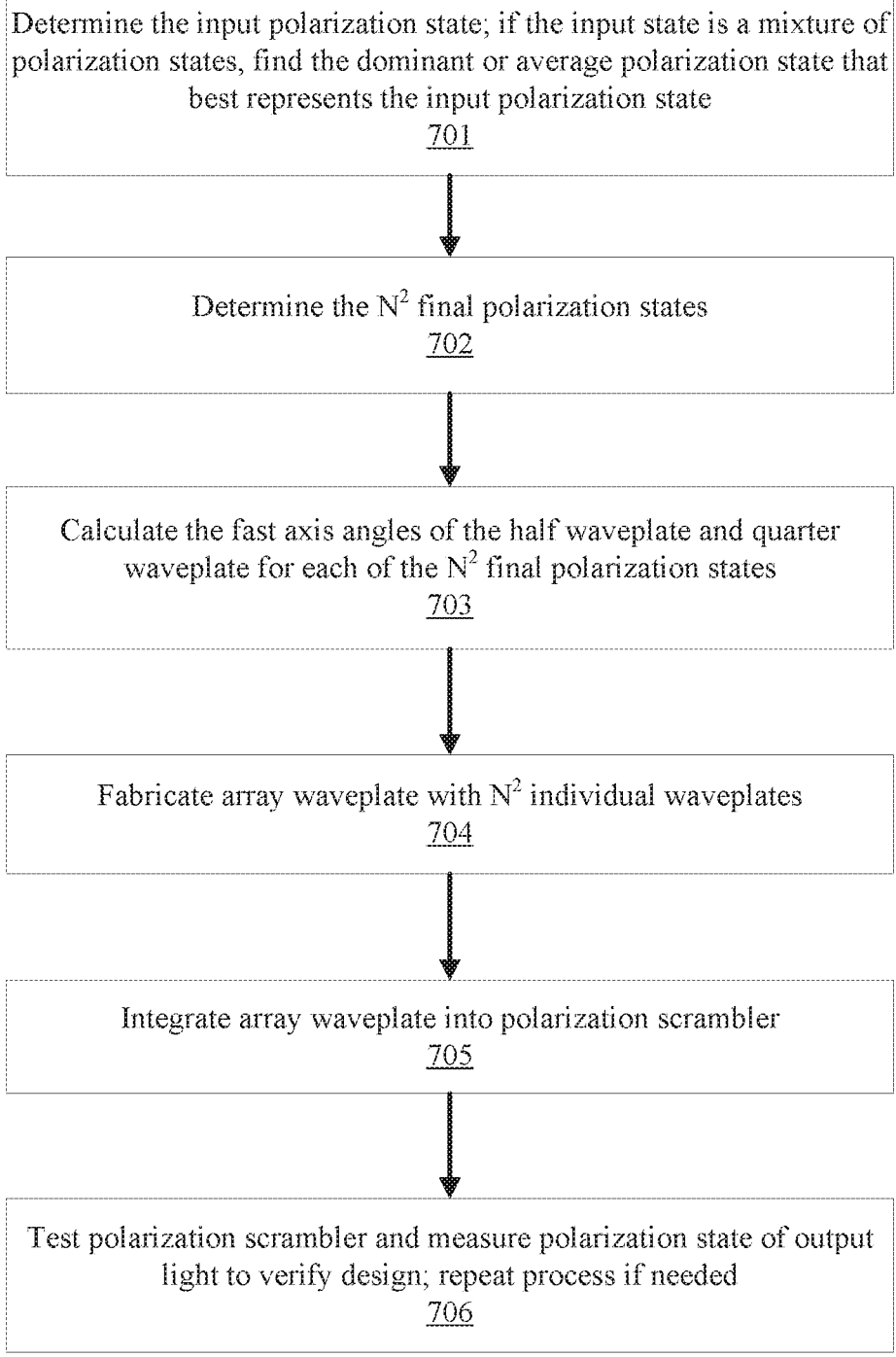
FIG. 7 illustrates a set of operations that may be carried out to design and test a polarization scrambler in accordance with an exemplary embodiment.

FIG. 7 illustrates a set of operations that may be carried out to design and test a polarization scrambler in accordance with an exemplary embodiment. At 701, the polarization state of the light that is (or would be) incident on the scrambler is determined. If the input state is a mixture of polarization states, a dominant polarization state is determined. For example, an average polarization state can be computed to represent the input polarization state. At 702, the desired output polarization states are selected or determined. For example, in some applications, a random distribution of all polarization states on the entire surface of the Poincaré sphere can be selected with the goal of minimizing the DOP of the output light. At 703, the fast axis angles of the half waveplate and the quarter waveplate in each of the grid elements are determined to allow the generation of the desired output polarization states. At 704, the array of waveplates is fabricated, selected, assembled or otherwise produced. At 705, the array waveplate is integrated into the polarization scrambler system (e.g., as shown in FIG. 2). At 706, the polarization scrambler is tested by measuring the output polarization states of the light. All or some of the above steps can be repeated, if needed, to obtain desired waveplate that produces the desired output light polarization characteristics.

It should be noted that once a scrambler is designed and produced to receive a particular linearly polarized light and to produce an output light having randomly distributed polarization states, such a scrambler can be used to with any linearly polarized light (e.g., LVP, LHP, etc.) and would produce an output light having uniformly distributed polarization states.

In some embodiments, upon a determination that the input light has two dominant polarization states, the two polarization states may be separated first by, e.g., a polarization beam splitter, and subsequently pass through two different polarization scramblers. This technique can be generalized to higher number of dominant polarization states.

Although the illustrative examples of the disclosed technology are described using a two-layer waveplate, in some embodiments more than two layers may be used to achieve a desired output polarization. Moreover, in some applications, only a single layer waveplate may be used. For example, if the incident beam is linearly polarized, only a grid array comprising a plurality of half waveplates having different fast axis angles may be used to produce output polarization states that reside on the equator of the Poincaré sphere. Similarly, a single-layer quarter waveplate can be used to produce light having polarization states that lie on a single curve on the Poincaré sphere. Alternatively, a single-layer of waveplate of fixed retardance, not necessarily limited to quarter or half wave retardance, can be used to produce light having elliptical or circular polarization states.

Additionally, a single-layer waveplate can be constructed to produce any desired output polarization state. For example, with reference to FIG. 4, a single-layer waveplate can be used to directly move the polarization state A to C (as opposed to going from A to B to C). However, forming an array of retarders using such single-layer waveplates would require each element (or many elements) of the array to have a different thickness or retardance. While such an array is desirable in some applications, in some scenarios where cost is an issue, having two-layer waveplates as described earlier, allows the thickness of the array to remain constant. In particular, as described in operation 703 of FIG. 7, each array element can have a different fast axis angle for the half waveplate and for the quarter waveplate, thus allowing the array thickness to remain constant for the entire array.

One advantage of the disclosed technology is the almost instantaneous conversion of polarization state that is limited by dispersion and by the difference between the optical path lengths incident on the waveplates. For example, light rays propagating through the scrambler device (e.g., the device 201 in FIG. 2) may have slightly different path lengths and have a small delay relative to each other. Another advantage is the passive nature of the scrambler, which does not require any power consumption, allowing the scrambler to be lightweight, and enabling its implementations where weight and/or power consumption are limiting factors. This is compared with existing LiNbO3 scramblers, which require signal generators and driving electronics for the LiNbO3 modulators.

The disclosed array waveplates can be fabricated using a variety of techniques, including photoalignment of liquid crystal polymers and/or laser direct writing. Example construction techniques for retarders, polarizers, and polarized-light emitters that can operate at multiple wavelengths and angles are described in U.S. Patent Application Publication No. 2016/0170110 A1 that is issued as U.S. Pat. No. 10,254,453 B2, which is incorporated by reference in this patent document.

One aspect of the disclosed embodiments relates to a polarization scrambler that includes a plurality of polarization elements, where each polarization element includes at least two layers. A first layer includes a half waveplate to rotate a polarization direction of light that is incident on the polarization element, and a second layer includes a quarter waveplate to receive light that exits the first layer and to change a polarization state of the light that exits the first layer to another polarization state. The polarization scrambler further includes a substrate to receive light that exits the second layer and to allow light to pass therethrough. The light that is output from the substrate includes a plurality of polarization states.

In one exemplary embodiment, each polarization element has a predetermined fast axis angle for the half waveplate and a predetermined fast axis angle for the quarter waveplate, and each of the predetermined fast axis angles for the half waveplate and the quarter waveplate are different for different polarization elements. In another exemplary embodiment, each of the predetermined fast axis angles for the quarter waveplate is selected to convert a linearly polarized light into a circularly or an elliptically polarized light. In still another exemplary embodiment, the plurality of the polarization elements is configured to have predetermined fast axis angles for the half waveplate and for the quarter waveplate for each of the polarization elements to cause the light that is output from all of the plurality of polarization elements to have a particular distribution of polarization states.

According to another exemplary embodiment, the particular distribution of polarization states includes one of: a uniform distribution of polarization states; a distribution of polarization states over a particular region of a Poincaré sphere; or a distribution of polarization states that is designed in accordance with a polarization mode dispersion or a polarization dependent loss of an optical communication channel. In one exemplary embodiment, the plurality of polarization elements are arranged as an array of elements, including a plurality of rows and a plurality of columns. In another exemplary embodiment, the plurality of polarization elements are arranged as a square grid. In still another exemplary embodiment, the plurality of polarization elements have a fixed thickness.

In one exemplary embodiment, the polarization scrambler is positioned within a polarization scrambling system that includes a light source configured to produce polarized or partially polarized light and a lens to receive the polarized or partially polarized light from the light source and to direct the polarized or partially polarized light from the light source to the polarization scrambler. In another exemplary embodiment, the lens is configured to collimate the polarized or partially polarized light, and the polarization scrambling system includes an additional lens positioned to receive the light that is output from the substrate and to produce a focused output light.

Another aspect of the disclosed embodiments relates to a method for producing a polarization scrambler comprising a plurality of polarization elements. The method includes determining a polarization state of an input light; for each of the plurality of polarization elements, obtaining a desired output light polarization state; for each of the plurality of polarization elements, determining a fast axis angle for a half waveplate and a fast axis angle for a quarter waveplate of the polarization element, the determined fast axis angles for a half waveplate and the quarter waveplate causing light that is output from the polarization element to have the desired output light polarization state for that polarization element; and producing the polarization scrambler having the plurality of polarization elements, each polarization elements fabricated to have the determined fast axis angles for a half waveplate and the quarter waveplate.

In one exemplary embodiment, the input light is a linearly polarized. In another exemplary embodiment, the input light includes a mixture of polarization states, and determining the polarization state of an input light includes determining a dominant polarization state of the input light. In yet another exemplary embodiment, determining the dominant polarization state of the input light includes determining an average polarization state of the input light. In still another exemplary embodiment, the above noted method further includes testing the polarization scrambler to determine whether each of the plurality of polarization elements produces the desired output light polarization state. In one exemplary embodiment, the desired output light polarization state of each polarization element is selected to cause the light that is output from the polarization scrambler to have a particular distribution of polarization states.

Another aspect of the disclosed embodiments relates to a polarization scrambler that includes a plurality of polarization elements, where each polarization element includes at least a first layer. The first layer is operable as a polarization retarder that causes a change in a polarization of an input light that is incident on the polarization element. Each of the plurality of polarization elements is configured to produce output light having a different polarization state than the polarization state of light that is output from other polarization elements. In one exemplary embodiment, the first layer of each of the plurality of the polarization elements has different fast axis angle and retardance than the first layer in other polarization elements, and wherein the fast axis angle and retardance of each of the first layers are selected to allow a particular distribution of polarization states of the output light on a Poincaré sphere. In another exemplary embodiment, the particular distribution is one of: a random distribution; a distribution over a particular region of a Poincaré sphere; or a distribution that is designed in accordance with a polarization mode dispersion or a polarization dependent loss of an optical communication channel. In still another exemplary embodiment, the first layer of each of the plurality of the polarization elements comprises a half waveplate having a fixed thickness value, each half waveplate having a fast axis angle that is different from fast axis angles of other half waveplates of the plurality of polarization elements to allow polarization states of the output light to be distributed on equator of a Poincaré sphere upon receiving an input light having a linear polarization. In yet another exemplary embodiment, the first layer of each of the plurality of the polarization elements comprises a quarter waveplate having a fixed thickness value, each quarter waveplate having a fast axis angle that is different from fast axis angles of other quarter waveplates of the plurality of polarization elements to allow polarization states of the output light to be distributed on a single curve on a Poincaré sphere.

Figure 8:
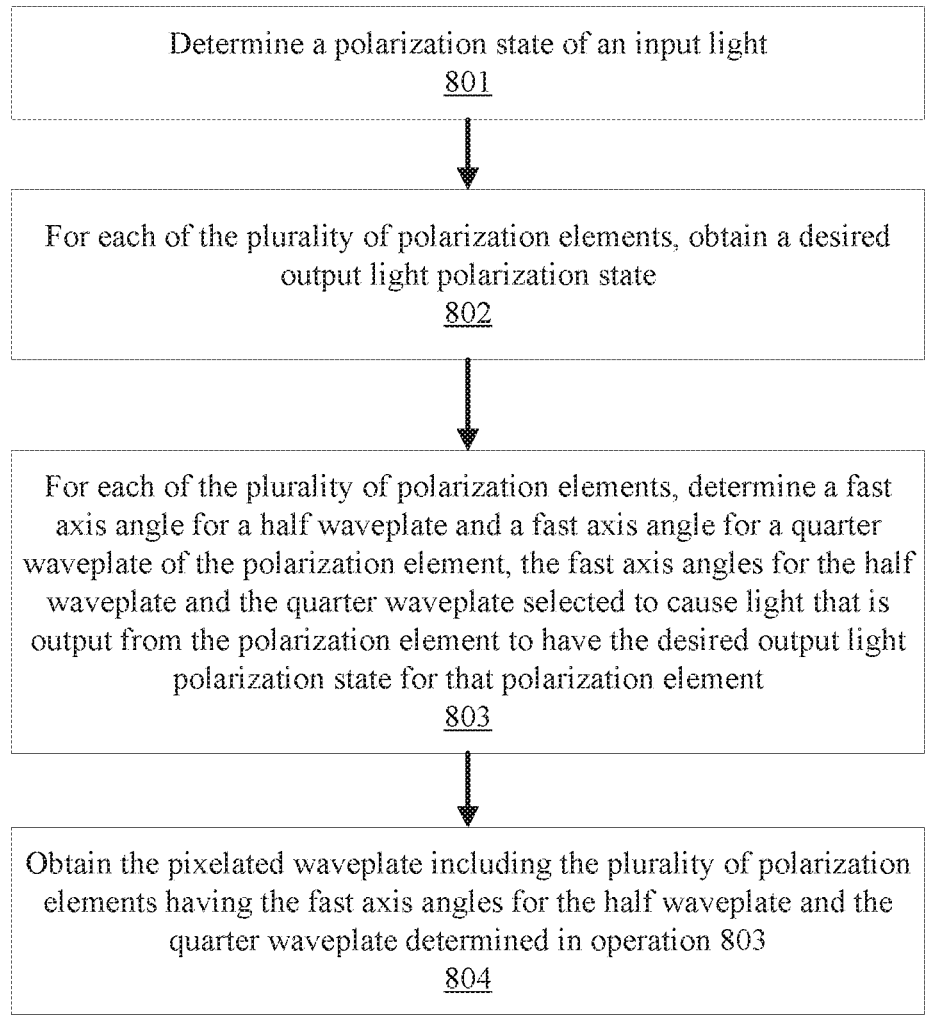
FIG. 8 illustrates a set of operation that can be carried out for producing a polarization scrambler comprising a pixelated waveplate including a plurality of polarization elements in accordance with an exemplary embodiment.

Another aspect of the disclosed embodiments is illustrated with reference to FIG. 8, which shows a set of operation that can be carried out for producing a polarization scrambler comprising a pixelated waveplate including a plurality of polarization elements. At 801, a polarization state of an input light is determined. At 802, for each of the plurality of polarization elements, a desired output light polarization state is obtained. At 803, for each of the plurality of polarization elements, a fast axis angle for a half waveplate and a fast axis angle for a quarter waveplate of the polarization element are determined. The fast axis angles for the half waveplate and the quarter waveplate ae selected to cause light that is output from the polarization element to have the desired output light polarization state for that polarization element. At 804, the pixelated waveplate including the plurality of polarization elements having the fast axis angles for the half waveplate and the quarter waveplate determined in operation 803 is obtained.

In one exemplary embodiment, the input light is a linearly polarized. In another exemplary embodiment, the input light includes a mixture of polarization states, and determining the polarization state of an input light includes determining a single polarization state of the input light. In some exemplary embodiments, determining the single polarization state includes determining one of: a dominant polarization state, an average of the polarization states or a centroid of the polarization states. In another exemplary embodiment, the above noted method further includes testing the polarization scrambler to determine whether each of the plurality of polarization elements produces the desired output light polarization state. In still another exemplary embodiment, the desired output light polarization state of each polarization element is selected to cause the light that is output from the polarization scrambler to have a particular distribution of polarization states.

Another aspect of the disclosed embodiments relates to a polarization scrambler that includes a plurality of polarization elements positioned to receive polarized or partially polarized light, where each polarization element includes at least two layers: a first layer that includes a half waveplate to rotate a polarization direction of the polarized or partially polarized light, and a second layer that includes a quarter waveplate to receive light that exits the first layer and to change a polarization state of the light that exits the first layer to another polarization state. The polarization scrambler further includes a substrate to receive light after exiting the second layer of each polarization element, and to allow the light received by the substrate to pass therethrough; the light output from the substrate includes a plurality of polarization states.

In one exemplary embodiment each polarization element has a predetermined fast axis angle for the half waveplate and a predetermined fast axis angle for the quarter waveplate that form a set of fast axis angles for the polarization element, and each polarization element has a different set of fast axis angles from another polarization element. In another exemplary embodiment, each of the predetermined fast axis angles for the quarter waveplate is selected to convert a linearly polarized light into a circularly or an elliptically polarized light. In still another exemplary embodiment, the plurality of the polarization elements is configured to have predetermined fast axis angles for the half waveplate and for the quarter waveplate for each of the polarization elements to cause the light that is output from the substrate to have a particular distribution of polarization states. In some exemplary embodiments, the particular distribution of polarization states includes one of: a uniform distribution of polarization states, a distribution of polarization states over a particular region of a Poincaré sphere, or a distribution of polarization states that is designed in accordance with a polarization mode dispersion or a polarization dependent loss of an optical communication channel.

According to one exemplary embodiment, the plurality of polarization elements is arranged as an array of elements, including a plurality of rows and a plurality of columns. For example, the plurality of polarization elements can be arranged as a square grid. In some exemplary embodiments, all polarization elements have a fixed and substantially equal thickness. In still another exemplary embodiment, the polarization scrambler is positioned within a polarization scrambling system that further includes a light source configured to produce the polarized or partially polarized light, and a lens to receive the polarized or partially polarized light from the light source and to direct the polarized or partially polarized light from the light source to the polarization scrambler. In one exemplary embodiment, the lens is configured to collimate the polarized or partially polarized light, and the polarization scrambling system includes an additional lens positioned to receive the light that is output from the substrate and to produce a focused output light. In yet another exemplary embodiment, the light output from the substrate includes a larger number of polarization states that the polarized or partially polarized light incident on the plurality of polarization elements. In still another exemplary embodiment, the polarized or partially polarized light incident on the plurality of polarization elements includes more than one polarization state, and the light output from the substrate includes more than two polarization states.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

The invention claimed is:

1. A polarization scrambler, comprising:
a plurality of polarization elements positioned to receive polarized or partially polarized light, each polarization element comprising at least two layers:
a first layer comprising a half waveplate to rotate a polarization direction of the polarized or partially polarized light, and
a second layer comprising a quarter waveplate to receive light that exits the first layer and to change a polarization state of the light that exits the first layer to another polarization state; and
a substrate to receive light exiting the second layer of each polarization element, and to allow the light received by the substrate to pass therethrough,
wherein a light output from the substrate includes a plurality of polarization states,
wherein fast axis angles of the half waveplate and the quarter waveplate are pre-computed for each of the plurality of polarization elements to produce a non-random distribution of output polarization states, having at least four different polarization states, on a section of a Poincaré sphere based on the pre-computed fast axis angles,
wherein, the pre-computed fast axis angles of the half waveplate and the quarter waveplate for each polarization element are collectively pre-computed based on a non-linear relationship between the non-random distribution of output polarization states and a polarization state of an input light having a polarization state different from the non-random distribution of output polarization states, and
wherein the polarization scrambler is a passive device that does not require power consumption for effectuating the particular distribution of output polarization states on the Poincaré sphere.

2. The polarization scrambler of claim 1, wherein:
the non-linear relationship based on a linearly polarized input light is represented by:

$$\tan(2\alpha) = \frac{\sin(4\theta_{HWP})\cos(2\theta_{QWP})\sin(2\theta_{QWP}) + \sin(4\theta_{HWP})\sin^2(\theta_{QWP})}{\cos(4\theta_{HWP})\cos^2(\theta_{QWP}) + \sin(4\theta_{HWP})\cos(2\theta_{QWP})\sin(2\theta_{QWP})}, \text{ and}$$

$$\sin(\varepsilon) = \cos(4\theta_{HWP})\sin(2\theta_{QWP}) - \sin(4\theta_{HWP})\cos(2\theta_{QWP}),$$

wherein $(\alpha,\varepsilon)$, represents a single point on any section of the Poincare sphere, and $(\theta_{QWP}, \theta_{HWP})$ represents the fast axis angles for the quarter and half waveplates.

3. The polarization scrambler of claim 2, wherein each of the pre-computed fast axis angles for the quarter waveplate is selected to convert a linearly polarized light into a circularly or an elliptically polarized light.

4. The polarization scrambler of claim 1, wherein:
the non-random distribution of output polarization states is selectively produced over only a particular region of the Poincaré sphere.

5. The polarization scrambler of claim 1, wherein the non-random distribution of output polarization states is selectively produced to include:
a distribution of polarization states that is designed in accordance with a polarization mode dispersion or a polarization dependent loss of an optical communication channel.

6. The polarization scrambler of claim 1, wherein the plurality of polarization elements is arranged as an array of elements, including a plurality of rows and a plurality of columns.

7. The polarization scrambler of claim 6, wherein the plurality of polarization elements is arranged as a square grid.

8. The polarization scrambler of claim 1, wherein all polarization elements have a fixed and substantially equal thickness.

9. The polarization scrambler of claim 1, positioned within a polarization scrambling system, the polarization scrambling system including:
- a light source configured to produce the polarized or partially polarized light; and
- a lens to receive the polarized or partially polarized light from the light source and to direct the polarized or partially polarized light from the light source to the polarization scrambler.

10. The polarization scrambler of claim 9, wherein the lens is configured to collimate the polarized or partially polarized light, and wherein the polarization scrambling system includes an additional lens positioned to receive the light that is output from the substrate and to produce a focused output light.

11. The polarization scrambler of claim 1, wherein the light output from the substrate includes a larger number of polarization states than the polarization states of the polarized or partially polarized light incident on the plurality of polarization elements.

12. The polarization scrambler of claim 1, wherein each polarization element consists of two polarization manipulating layers: the half waveplate as part of the first layer, and the quarter waveplate as part of the second layer.

13. A method for producing a polarization scrambler comprising a pixelated waveplate including a plurality of polarization elements, the method comprising:
  (a) determining a polarization state of an input light;
  (b) for each of the plurality of polarization elements, obtaining a desired output light polarization state, the desired output light polarization states from the plurality of polarization elements corresponding to a non-random distribution of polarization states on a section of a Poincare sphere;
  (c) for each of the plurality of polarization elements, computing a fast axis angle for a half waveplate and a fast axis angle for a quarter waveplate of the polarization element, wherein the fast axis angles for the half waveplates and the quarter waveplates for the plurality of polarization elements are computed to collectively produce the non-random distribution of polarization states, having at least four different polarization states, on the section of the Poincare sphere based on a non-linear relationship between the non-random distribution of output polarization states and the polarization state of the input light which is different from the non-random distribution of output polarization states; and
  (d) obtaining the pixelated waveplate including the plurality of polarization elements having the fast axis angles for the half waveplate and the quarter waveplate determined in operation (c), the pixelated waveplate being a passive device that does not require power consumption for effectuating a distribution of output polarization states on the Poincaré sphere corresponding to the non-random output polarization states produced by the plurality of the polarization elements.

14. The method of claim 13, wherein the input light is a linearly polarized.

15. The method of claim 13, wherein the input light includes a mixture of polarization states, and determining the polarization state of an input light includes determining a single polarization state of the input light.

16. The method of claim 15, wherein determining the single polarization state includes determining one of: a dominant polarization state, an average of the polarization states or a centroid of the polarization states.

17. The method of claim 13, further comprising:
testing the polarization scrambler to determine whether each of the plurality of polarization elements produces the desired output light polarization state.

18. The method of claim 13, wherein the non-random distribution of output polarization states is selectively produced to include:
a distribution of polarization states that is designed in accordance with a polarization mode dispersion or a polarization dependent loss of an optical communication channel.

19. The method of claim 13, wherein producing the polarization scrambler includes arranging the plurality of polarization elements in the pixelated waveplate as an array of elements, including a plurality of rows and a plurality of columns.

20. A polarization scrambler, comprising:
a plurality of polarization elements, each polarization element comprising at least a first layer and a second layer, the first layer operable as a first polarization retarder and the second layer operable as a second polarization retarder that collectively cause a change in a polarization of an input light that is incident on the polarization element, wherein:
each of the plurality of polarization elements is configured to produce output light having a polarization state different from the polarization state of light that is output from other polarization elements,
a fast axis of each of the retarder elements in each polarization element is pre-computed to selectively produce, for a linearly polarized light input to the polarization scrambler, a non-random distribution of polarization states over a particular region of a Poincaré sphere, having at least four different polarization states, output from the polarization scrambler due to polarization changes imparted collectively by the first and the second polarization retarders of the plurality of polarization elements, wherein the pre-computed fast axis angles of the retarder elements in each polarization retarder are collectively pre-computed based on a non-linear relationship between the non-random distribution of output polarization states and the polarization state of the input light which is different from the non-random distribution of output polarization states; and
the polarization scrambler is a passive scrambler that does not require power consumption for effectuating the particular output distribution of polarization states on the Poincaré sphere.

21. The polarization scrambler of claim 20, wherein the first layer and the second layer of each of the plurality of the polarization elements have fast axis angles and retardances different from those of the first layer and the second layer in other polarization elements, and wherein the fast axis angles and retardances of each of the first and second layers are computed based on a desired set of angles associated with the non-uniform distribution of polarization states of the output light on the Poincaré sphere.

22. The polarization scrambler of claim 20, wherein the particular distribution is:
a distribution that is designed in accordance with a polarization mode dispersion or a polarization dependent loss of an optical communication channel.

23. The polarization scrambler of claim 20, wherein the first polarization retarder includes a half waveplate and the second polarization retarder includes a quarter waveplate.

\* \* \* \* \*